US011836179B1

(12) United States Patent
Cheung et al.

(10) Patent No.: US 11,836,179 B1
(45) Date of Patent: Dec. 5, 2023

(54) MULTIMEDIA QUERY SYSTEM

(71) Applicant: Meta Platforms Technologies, LLC, Menlo Park, CA (US)

(72) Inventors: Vincent Charles Cheung, San Carlos, CA (US); Tali Zvi, San Carlos, CA (US); Kent Austin White, Mountain View, CA (US); Kevin Lin, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 799 days.

(21) Appl. No.: 16/667,494

(22) Filed: Oct. 29, 2019

(51) Int. Cl.
*G06F 7/00* (2006.01)
*G06F 16/432* (2019.01)
*G06F 16/41* (2019.01)
*G06F 16/487* (2019.01)
*G06N 3/08* (2023.01)
*G06F 16/48* (2019.01)
*G06F 16/483* (2019.01)

(52) U.S. Cl.
CPC ............ *G06F 16/432* (2019.01); *G06F 16/41* (2019.01); *G06F 16/483* (2019.01); *G06F 16/487* (2019.01); *G06F 16/489* (2019.01); *G06N 3/08* (2013.01)

(58) Field of Classification Search
CPC .... G06F 16/432; G06F 16/487; G06F 16/489; G06F 16/483; G06F 16/41; G06N 3/08
USPC ................... 707/600–899; 607/722
See application file for complete search history.

(56) References Cited

U.S. PATENT DOCUMENTS

| 8,121,968 | B2 | 2/2012 | Eaton et al. |
| 8,189,905 | B2 | 5/2012 | Eaton et al. |
| 8,625,884 | B2 | 1/2014 | Cobb et al. |
| 9,111,148 | B2 | 8/2015 | Seow et al. |
| 10,679,614 | B2 * | 6/2020 | Anders ................. G06F 3/167 |
| 11,398,088 | B2 * | 7/2022 | Spivack ................ G06F 16/387 |
| 2010/0013931 | A1 * | 1/2010 | Golan .................. G06K 9/6253 348/150 |
| 2013/0166303 | A1 * | 6/2013 | Chang ................ G06F 16/7834 707/723 |
| 2015/0078656 | A1 | 3/2015 | Cobb et al. |

* cited by examiner

*Primary Examiner* — Isaac M Woo
(74) *Attorney, Agent, or Firm* — Potomac Law Group, PLLC

(57) ABSTRACT

A multimedia query system is described that includes a multimedia capture system configured to capture raw multimedia data comprising at least one of raw video data or raw audio data, a metadata engine configured to extract one or more anchor points of metadata from the raw multimedia data and to store the one or more anchor points of metadata, wherein the anchor points of metadata includes references to respective portions of the raw multimedia data. The multimedia query system further includes a storage engine configured to store the raw multimedia data, a recall engine configured to receive a query and to apply the query to the one or more anchor points of metadata to identify one or more raw multimedia data candidates from the portions of the raw multimedia data, and a query engine configured to generate a response to the query based on the one or more raw multimedia data candidates.

20 Claims, 8 Drawing Sheets

MULTIMEDIA QUERY SYSTEM

TECHNICAL FIELD

This disclosure generally relates to multimedia data capture and storage systems, and more particularly, to a multimedia query system.

BACKGROUND

Multimedia data capture systems are commonly used to capture raw multimedia data, including raw video data or raw audio data. Most multimedia data capture and storage systems can provide general information about multimedia file including the size of the multimedia data file, the duration of the multimedia content, the media type, etc. Some multimedia data capture and storage systems can perform some data processing on the content of the multimedia data including performing face or object recognition in video data or performing natural language processing on audio data.

SUMMARY

In general, this disclosure describes a multimedia query system that stores and provides searchable multimedia 'memories' for a user. For example, the system may keep a repository of raw multimedia data captured by a user (e.g., using one or more augmented reality or other computing devices). The system may capture raw video, audio data, and/or other data, such as location information, calendar event data for the user, physiological data for the user, etc. The system applies an initial set of artificial intelligence (AI)/machine learning (ML) models trained to extract anchor point metadata from the raw multimedia data to aid subsequent searches of raw multimedia data. For example, the system can apply facial and object recognition AI/ML models to learn and identify persons or objects in the multimedia data as well as AI/ML models to extract start time and end time, location and other metadata, such as calendar information, topics discussed in conversations engaged by the user, etc.

Based on the captured raw multimedia data, the extracted anchor point metadata, and in some cases on user preferences, the system determines whether the captured multimedia data and anchor point metadata for the captured multimedia data should be stored. In some examples, the systems stores all raw multimedia data and corresponding anchor point metadata for a window of time (e.g., 24 hours, a week, a month) in a first repository and determine the portions of that raw multimedia data to store in a second repository after the first period of time. For example, the system may keep all raw multimedia data and the anchor point metadata in local memory (e.g., in a cache) for a day and later select one or more portions of the multimedia data and corresponding anchor points metadata to move to remote memory (e.g., on a cloud, server, or database). In some examples, the system applies another set of AI/ML models trained to determine the portions of the raw multimedia data and corresponding anchor point metadata to store in the second repository.

The system may subsequently receive a query for information that may be answerable by analyzing the raw multimedia data. The system may apply the query to the stored anchor points of metadata to identify raw multimedia data candidates that may potentially contain information related to the query. In this way, the stored anchor points of metadata serve as starting points for searching of the raw multimedia data. The system then applies another set of AI/ML models to the raw multimedia data candidates to infer a response to the query, which the system generates and returns as a query response.

In one or more example aspects, a multimedia query system comprises a multimedia capture system configured to capture raw multimedia data comprising at least one of raw video data or raw audio data; a metadata engine configured to extract one or more anchor points of metadata from the raw multimedia data and to store the one or more anchor points of metadata, wherein the anchor points of metadata includes references to respective portions of the raw multimedia data; a storage engine configured to store the raw multimedia data; a recall engine configured to receive a query and to apply the query to the one or more anchor points of metadata to identify one or more raw multimedia data candidates from the portions of the raw multimedia data; and a query engine configured to generate a response to the query based on the one or more raw multimedia data candidates.

In one or more further example aspects, a method comprises extracting, by the server, one or more anchor points of metadata from raw multimedia data captured by a multimedia capture system, the raw multimedia data comprising at least one of raw video data or raw audio data, wherein the one or more anchor points of metadata includes references to respective portions of the raw multimedia data; storing, by a server, the one or more anchor points of metadata; storing, by the server, the raw multimedia data; receiving, at the server, a query; applying, by the server, the query to the or more anchor points of metadata to identify one or more raw multimedia data candidates, generate, by the server, a response to the query based on the one or more raw multimedia data candidates.

In one or more additional example aspects, a computer-readable storage medium comprises instructions that configure one or more programmable processors to extract one or more anchor points of metadata from raw multimedia data captured by a multimedia capture system, the raw multimedia data comprising at least one of raw video data or raw audio data, wherein the one or more anchor points of metadata includes references to respective portions of the raw multimedia data; store the one or more anchor points of metadata; store the raw multimedia data; receive a query; apply the query to the or more anchor points of metadata to identify one or more raw multimedia data candidates, and generate a response to the query based on the one or more raw multimedia data candidates.

These techniques have various technical advantages and practical applications. For example, these techniques provide a multimedia query system that automatically stores and queries searchable multimedia 'memories' for a user that can be used to respond to unpredictable queries. These techniques may be beneficial in systems with limited local storage and processing capacities. By extracting anchor point metadata from raw multimedia data and searching that anchor point metadata to identify candidate multimedia data, the system reduces the amount of raw multimedia data processing that it must perform, which can reduce processing times and power consumption.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
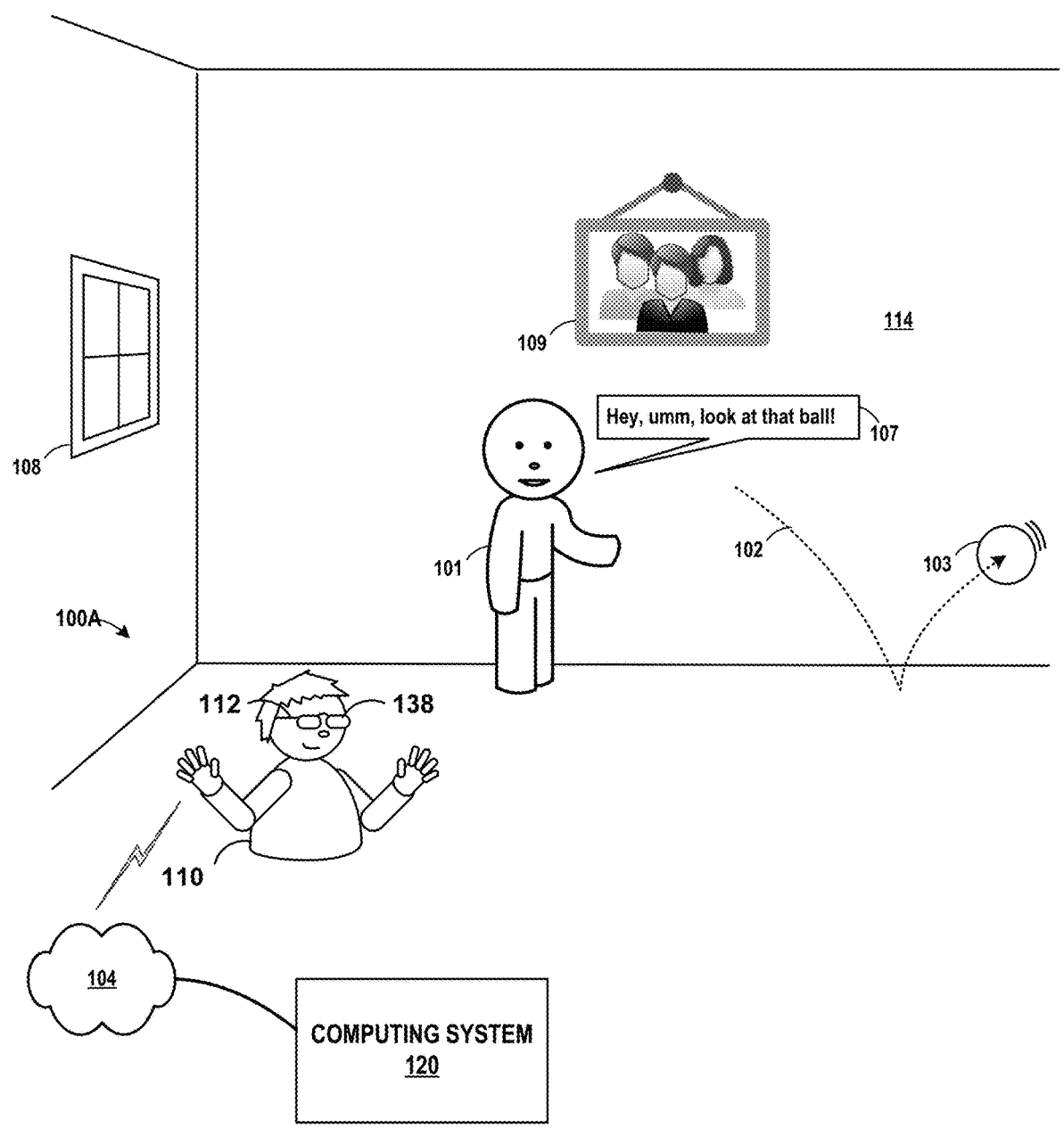
FIG. 1A is an illustration depicting an example multimedia query system that automatically stores and queries searchable multimedia data for a user in accordance with the techniques of the disclosure.

FIG. 1A is an illustration depicting an example multimedia query system that automatically stores and queries searchable multimedia data for a user in accordance with the techniques of the disclosure. Multimedia query system 100A is depicted within environment 114. In the example shown, environment 114 includes user 110, person 101, object 103, window 108, and portrait 109. System 100A includes head mounted device (HMD) 112 including one or more multimedia capture systems (e.g., cameras, infrared (IR) detectors, Doppler radar, line scanners and the like, for capturing image and/or video data of the surrounding physical environment 114, and microphones and other audio devices for capturing audio data) 138 configured to capture raw multimedia data, including raw video data and raw audio data. HMD 112 is illustrated as being in communication, via network 104, with computing system 120, which may correspond to a computing resource in any form. For example, computing system 120 may be a physical computing device or may be a component of a cloud computing system, server farm, and/or server cluster (or portion thereof) that provides services to client devices and other devices or systems. Accordingly, computing system 120 may represent one or more physical computing devices, virtual computing devices, virtual machines, containers, and/or other virtualized computing device.

Network 104 may be the internet, or may include or represent any public or private communications network or other network. For instance, network 104 may be or may include a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 104 using any suitable communication techniques. Network 104 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 1A may be operatively coupled to network 104 using one or more wired or wireless links.

FIG. 1A depicts a scene in which a subject, such as person 101, points to object 103 traveling along path 102. While pointing, person 101 says "Hey, umm, look at that ball!" in reference to object 103. During the scene, HMD 112 captures raw image and audio data using multimedia capture system 138. In some examples, HMD 112 also captures other information such as, for example, location information (e.g., GPS coordinates) and/or physiological data for user 110 (e.g., heartbeat or electrocardiogram data generated by a monitoring sensor and received by HMD 112). In the example of FIG. 1A, multimedia query system 100A includes head mounted device (HMD) 112. In some examples, HMD 112 includes an electronic display and optical assembly for presenting artificial reality content to user 110. In addition, HMD 112 may include one or more motion sensors (e.g., accelerometers) for tracking motion of the HMD 112

In FIG. 1A, person 101 is part of the scene in the sense that person 101 is a subject of the captured video and is also a source of audible speech occurring in the scene. However, in other examples, person 101 might not be a subject of captured video in the scene, and/or might not be a source of audible speech occurring in the scene. In such other examples, the captured images may have a different subject and audio may be generated by a different source. In addition, some scenes may include a plurality of other persons, users, or human subjects. For illustration purposes, examples are described herein as capturing images of person 101 and audio from speech spoken by person 101. However, it should be understood that other techniques in accordance with one or more aspects of this disclosure may encompass other types of scenes, involving captured images of other subjects and captured audio generated by other persons, objects, or subjects, including user 110.

In some examples, user 110 may establish rules or user preferences for storing or even capturing multimedia data with respect to certain locations, persons, or topics. For example, a user may set a user preference not to store or capture multimedia data in a restroom, a user preference not to store or capture multimedia data regarding health topics, a user preference to always store multimedia data of the user's child, and the like.

In some examples described herein, HMD 112 may capture raw multimedia data of a scene, such as that depicted in FIG. 1A, apply an initial set of artificial intelligence (AI)/machine learning (ML) models trained to extract anchor point metadata from the raw multimedia data, and store the anchor point metadata in association with portions of the raw multimedia data. In the example shown in FIG. 1A, the extracted anchor point metadata may include an indication that person 101 and object 103 were captured in the raw video data and/or that a ball was referenced in the audio. The extracted anchor point metadata may further include location information. Anchor point metadata may include one or more references to portions of raw multimedia data, the references being, e.g., time/date information, file references, time ranges for portions of multimedia data, object labels that identify different objects within referenced raw multimedia data, audio labels that identify different objects or topics mentioned within reference raw multimedia data, and so forth. A time range may be used to specify, for instance, a range of time in a video in which a certain object is present.

In some examples, HMD 112 may store anchor point metadata and the raw multimedia data in local memory for window of time (e.g., 24 hours, a week, a month). After the window of time, the anchor point metadata and the raw multimedia data is purged from local memory. In some examples, HMD 112 transmits the raw multimedia data and anchor point metadata to computing system 120 over network 104. For example, HMD 112 may transmit, via network 104, the raw multimedia data and anchor point metadata to computing system 120 at the end of the window of time, when the multimedia data and anchor point metadata is purged. In another example, HMD 112 transmits the raw multimedia data and/or anchor point metadata to computing system 120 (e.g., in real time or in near-real time as the raw multimedia data is captured). In some examples, computing system 120 stores the received raw multimedia data in a first repository and stores the received anchor point metadata in a second repository. The first repository and the second repository may be the same or different repositories. In some examples, the first repository and/or the second repository may be part of computing system 120 or may be separate from computing system 120 (e.g., may be separate database(s) in communication with computing system 120 and/or HMD 112 over network 104).

In some examples described herein, HMD 112 may capture raw multimedia data of a scene and transmits the captured raw multimedia data to computing system 120 over network 104. The computing system 120 then applies the initial set of AI/ML models trained to extract anchor point metadata from the raw multimedia data received from HMD 112, and stores the raw multimedia data in the first repository and the extracted anchor point metadata in the second repository.

In some examples, computing system 120 stores captured raw multimedia data and extracted anchor point metadata. In other examples, HMD 112 or computing system 120 determines whether the captured raw multimedia data and the corresponding anchor point metadata should be stored by computing system 120 (e.g., after the window of time that this information is stored on HMD 112) based on the captured raw multimedia data, the corresponding anchor point metadata, input from user 110, and/or user preferences. For example, HMD 112 may prompt user 110 whether computing system 120 should to store the raw multimedia data of environment 114 (e.g., at the end of the window of time). Based on the user input, multimedia query system 100A may train AL/ML models to determine what raw multimedia data to store (or even capture) in the future. For example, a user 110 may repeatedly indicate the raw multimedia data captured in a sensitive area should not be stored. Multimedia query system 100A may, based on these indications, subsequently eschew capturing multimedia when user 110 is located in the sensitive area.

Computing system 120 may subsequently receive a query. For example, user 110 may enter a query at HMD 112 or any other computing device (not shown) at a later time when user 110 is not in environment 114. Below are some example queries entered by user 110 where John corresponds to person 101 in FIG. 1A:
  a. "When was the last time I saw John?"
  b. "What color was the ball that John was playing with when I last saw him?"
  c. "Who is in the portrait at John's home?"

In some examples, user 110 may simply speak these queries and HMD 112 may automatically detect them using known natural language processing (NLP) techniques on the captured audio data. In other examples, user 110 may enter these queries via a peripheral device (e.g., a keyboard) in a web browser or application interfacing with computing system 120. In response to receiving a query, computing system 120 applies the query to the stored anchor points of metadata to identify raw multimedia data candidates that may potentially contain information related to the query. For example, for the query "who is in the portrait at John's home?", computing system 120 may search the anchor point metadata for one or more anchor points that include, e.g., "John" (i.e., person 101), "John's home" (e.g., the actual coordinates of the home or the label "John's home" associated with the physical location of the home), and/or "portrait." In this way, the stored anchor points of metadata serve as starting points for searching the raw multimedia data. In response to applying the query to the stored anchor point metadata, computing system 120 may obtain one or more portions of the raw multimedia data captured in the example shown in FIG. 1A. Computing system 120 then applies another set of AI/ML models to the obtained one or more portions of raw multimedia data candidates to infer a response to the query. For example, computing system 120 may apply object recognition techniques to one or more images of the retrieved raw multimedia data to locate portrait 109 and then apply face recognition techniques to the pixels corresponding to portrait 109 in one or more images of the retrieved raw multimedia data candidates to determine a response to "who is in the portrait at John's house?". This response can comprise information about the three persons in portrait 109 (e.g., names, pictures, profile information), and/or an image or video data of portrait 109. In some examples, computing system 120 may apply object recognition techniques to one or more images of the retrieved raw multimedia data to locate portrait 109 and obtain image or video data of portrait 109 as the response, e.g., without applying any facial recognition techniques to the one or more images of the retrieved raw multimedia data.

Accordingly, the multimedia query system as described herein may provide searchable multimedia 'memories' for a user that can be used to respond to unpredictable queries. These techniques may be beneficial in systems with limited local storage and processing capacities. By extracting anchor point metadata from raw multimedia data and searching that anchor point metadata to identify candidate multimedia data, the system reduces the amount of raw multimedia data processing that it must perform which can reduce processing times, power consumption, bandwidth consumption, storage utilization, and may provide lower-latency response times for queries versus other systems.

Figure 1B:
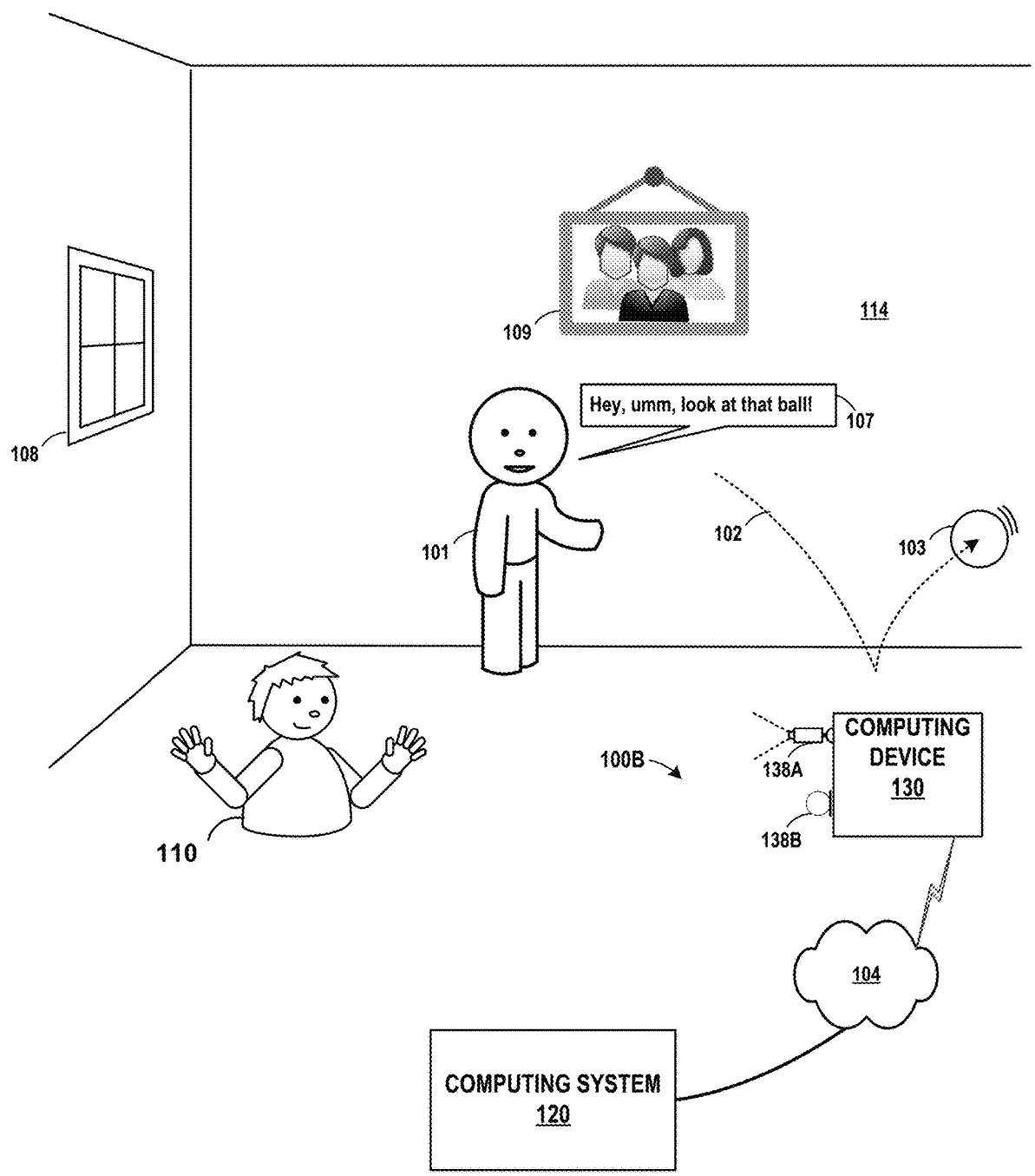
FIG. 1B is an illustration depicting another example multimedia query system that automatically stores and queries searchable multimedia data for a user in accordance with the techniques of the disclosure.

FIG. 1B is an illustration depicting another example multimedia query system that automatically stores and queries searchable multimedia data for a user in accordance with the techniques of the disclosure. System 100B is depicted within environment 114 of FIG. 1B. In this example, environment 114 includes computing device 130, user 110, person 101, object 103, window 108, and portrait 109. Computing device 130 includes multimedia capture systems 138 configured to capture raw multimedia data, including raw video data and/or raw audio data. Specially, computing device 130 includes image capture device 138A configured to capture raw video data and audio capture device 138B configured to capture raw audio data (collectively, "multimedia capture system 138"). Computing device 130 in FIG. 1B is shown as a single computing device, which may correspond to a mobile phone, a tablet, a smart watch, a gaming console, workstation, a desktop computer, laptop, assistant device, special-purpose tabletop device, or other computing device. In other examples, computing device 130 may be distributed across a plurality of computing devices.

In some examples, computing device 130 can perform similar multimedia capture and storage operations as described above with reference to HMD 112 in FIG. 1A. For example, similar to HMD 112 of FIG. 1A, computing device 130 may capture raw multimedia data of a scene, such as that depicted in FIG. 1B, apply an initial set of AI/ML models trained to extract anchor point metadata from the raw multimedia data, and store the anchor point metadata and the raw multimedia data. In some examples, computing device 130 may store anchor point metadata and the raw multimedia data in local memory for window of time (e.g., 24 hours, a week, a month). After the window of time, the anchor point metadata and the raw multimedia data is purged from local memory.

In some examples, computing device 130 transmits the raw multimedia data and anchor point metadata to computing system 120 over network 104. For example, computing device 130 may transmit, via network 104, the raw multimedia data and anchor point metadata to computing system 120 at the end of the window of time, when the multimedia data and anchor point metadata is purged. In another example, computing device 130 does not store the raw multimedia data and/or anchor point metadata locally and instead transmits the raw multimedia data and/or anchor point metadata to computing system 120 (e.g., in real time or near-real time). In some examples, raw multimedia data from multiple sources are transmitted to computing system 120 (e.g., serially or concurrently). For example, both the HMD 112 of FIG. 1A and the computing device 130 of FIG. 1B may be present in environment 114, and both may capture and transmit raw multimedia data to computing system 120.

Computing device 130 may receive queries via an interface, such as via one of multimedia capture devices 138A-138B or via a peripheral device such as a mouse or keyboard. Computing device 130 may transmit a representation of the query to computing system 120 to request a response and receive a response, which computing device 130 may output to the querying user via, e.g., a display device or speaker.

In some examples of multimedia query systems 100A, 100B, different devices may perform capture, anchor point metadata generation, and query reception. For example, HMD 112 may capture raw multimedia data and transmit the raw multimedia data to computing system 120, which generates anchor point metadata for portions of the raw multimedia data and stores the anchor point metadata and raw multimedia data. User 110 or another user may input queries to a different computing device, such as a mobile device, tablet, or assistant device. This computing device may transmit the queries to computing system 120, which processes the queries and sends a response to this computing device, which may output the response to the querying user.

Figure 2A:
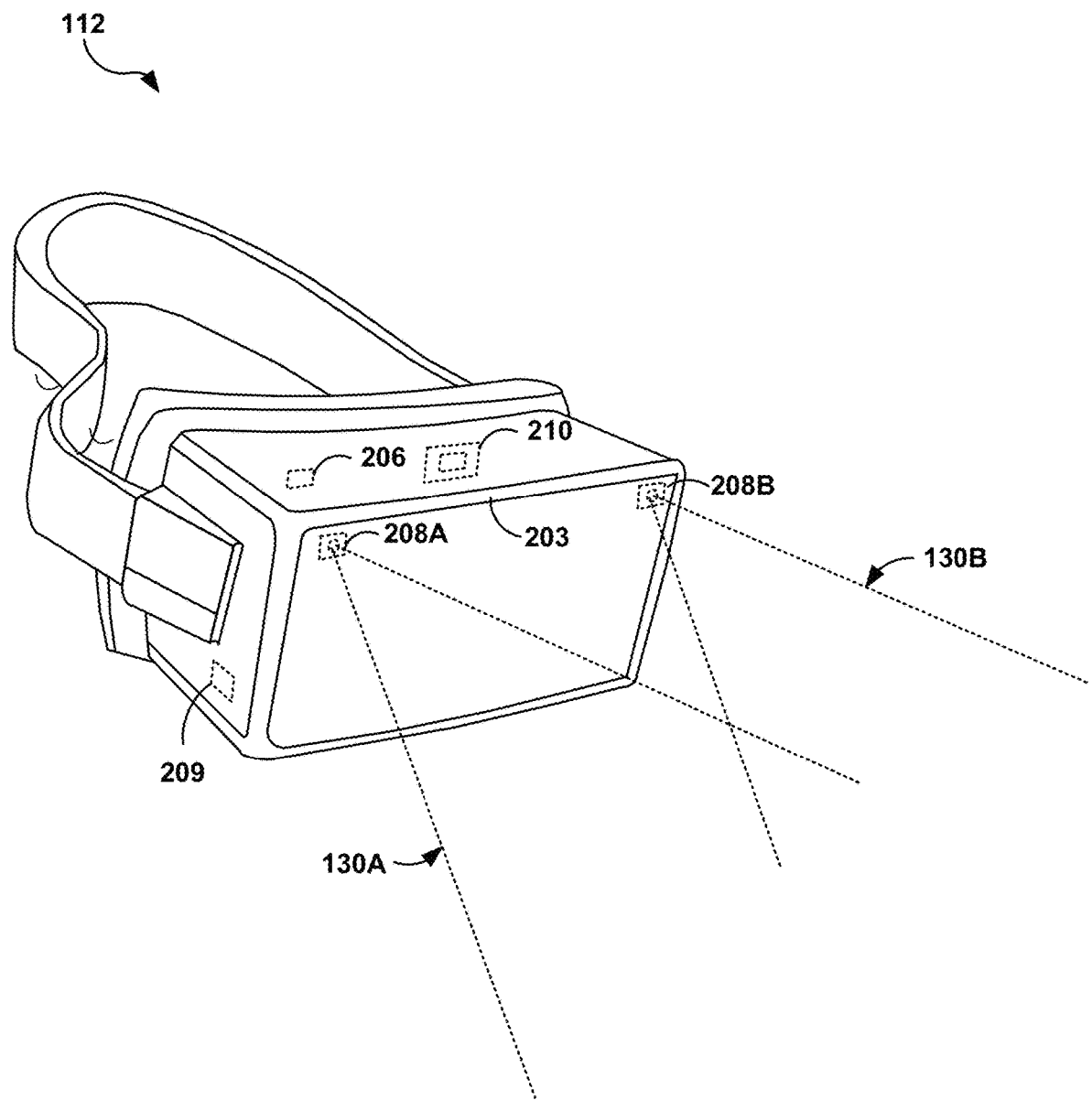
FIG. 2A is an illustration depicting an example head-mounted display (HMD), in accordance with techniques of the disclosure.

FIG. 2A is an illustration depicting an example HMD 112 configured to operate in accordance with the techniques of the disclosure. HMD 112 of FIG. 2A may be an example of HMD 112 of FIG. 1A. HMD 112 may operate as a stand-alone, mobile artificial realty system configured to implement the techniques described herein or may be part of a multimedia query system, such as multimedia query systems 100A, 100B of FIGS. 1A-1B.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of HMD 112. In other examples, HMD 112 may take the form of other wearable head mounted displays, such as glasses or goggles (e.g., as shown in FIGS. 1A, 2B).

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 208A and 208B (collectively, "image capture devices 208B") (e.g., video cameras, still cameras, IR scanners, UV scanners, laser scanners, Doppler radar scanners, depth scanners) and one or more audio capture devices 209 (e.g., microphones) configured to capture raw image and audio data, respectively. Image capture devices 208 can be examples of multimedia capture system 138 of FIG. 1A and image capture device 138A of FIG. 1B and audio capture devices 209 can be example multimedia capture system 138 of FIG. 1A and audio capture device 138B of FIG. 1B. In some aspects, image capture devices 208 can capture image data from a visible spectrum and an invisible spectrum of the electromagnetic spectrum (e.g., IR light). The image capture devices 208 may include one or more image capture devices that capture image data from the visible spectrum and one or more separate image capture devices that capture image data from the invisible spectrum, or these may be combined in the same one or more image capture devices. More specifically, image capture devices 208 capture image data representative of objects in the physical environment that are within a field of view 130 of image capture devices 208, which typically corresponds with the viewing perspective of HMD 112, and audio capture devices 209 capture audio data within a vicinity of HMD 112 (e.g., within 360 degree range of the audio capture devices). HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to apply an initial set of AI/ML models (e.g., face recognition, object recognition, voice recognition models) trained to extract anchor point metadata from the raw multimedia data captured with image capture devices 208 and audio capture devices 209 and store the anchor point metadata in association with portions of the raw multimedia data (e.g., in local memory). In some examples, control unit 210 may be configured to store anchor point metadata and the raw multimedia data in local memory for window of time (e.g., 24 hours, a week, a month). After the window of time, control unit 210 may cause the anchor point metadata and the raw multimedia data to be purged from local memory. In some examples, control unit 210 causes the raw multimedia data and anchor point metadata to be transmitted to computing system 120 over network 104. For example, control unit 210 may cause the raw multimedia data and anchor point metadata to be transmitted, via network 104, to computing system 120 before purging multimedia data and anchor point metadata (e.g., at the end of the window of time). In another example, control unit 210 causes the raw multimedia data and/or anchor point metadata to be transmitted to computing system 120 (e.g., in real time or in near-real time as the raw multimedia data is captured).

Figure 2B:
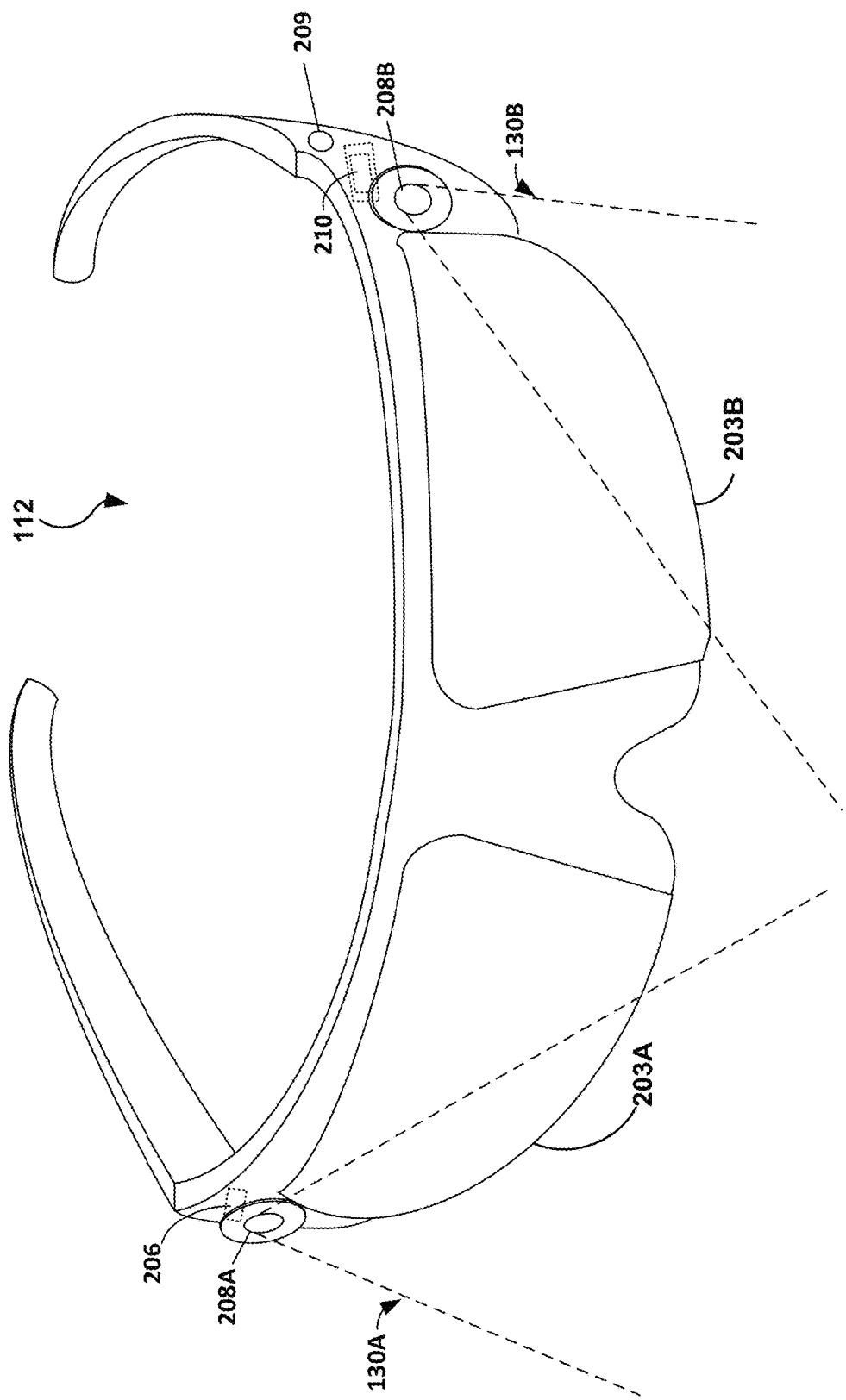
FIG. 2B is an illustration depicting another example HMD, in accordance with techniques of the disclosure.

FIG. 2B is an illustration depicting an example HMD 112, in accordance with techniques of the disclosure. As shown in FIG. 2B, HMD 112 may take the form of glasses. HMD 112 of FIG. 2A may be an example of any of HMD 112 of FIG. 1A. HMD 112 may be part of a multimedia query system, such as multimedia query systems 100A, 100B of FIGS. 1A-1B, or may operate as a stand-alone, mobile multimedia query system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 208A and 208B (collectively, "image capture devices 208") (e.g., video cameras, still cameras, IR scanners, UV scanners, laser scanners, Doppler radar scanners, depth scanners) and one or more audio capture devices 209 (e.g., microphones), configured to capture raw image and audio data, respectively. Image capture devices 208 can be examples of multimedia capture system 138 of FIG. 1A and image capture device 138A of FIG. 1B and audio capture devices 209 can be example multimedia capture system 138 of FIG. 1A and audio capture device 138B of FIG. 1B. In some aspects, image capture devices 208 can capture image data from a visible spectrum and an invisible spectrum of the electromagnetic spectrum (e.g., IR light). The image capture devices 208 may include one or more image capture devices that capture image data from the visible spectrum and one or more separate image capture devices that capture image data from the invisible spectrum, or these may be combined in the same one or more image capture devices. More specifically, image capture devices 208 capture image data representative of objects in the physical environment that are within a field of view 130 of image capture devices 208, which typically corresponds with the viewing perspective of HMD 112, and audio capture devices 209 capture audio data within a vicinity of HMD 112 (e.g., within 360 degree range of the audio capture devices. HMD 112 includes an internal control unit 210, which may include an internal power source and one or more printed-circuit boards having one or more processors, memory, and hardware to provide an operating environment for executing programmable operations to process sensed data and present artificial reality content on display 203. In accordance with the techniques described herein, control unit 210 of FIG. 2B is configured to operate similarly to control unit 210 of FIG. 2A.

Figure 3:
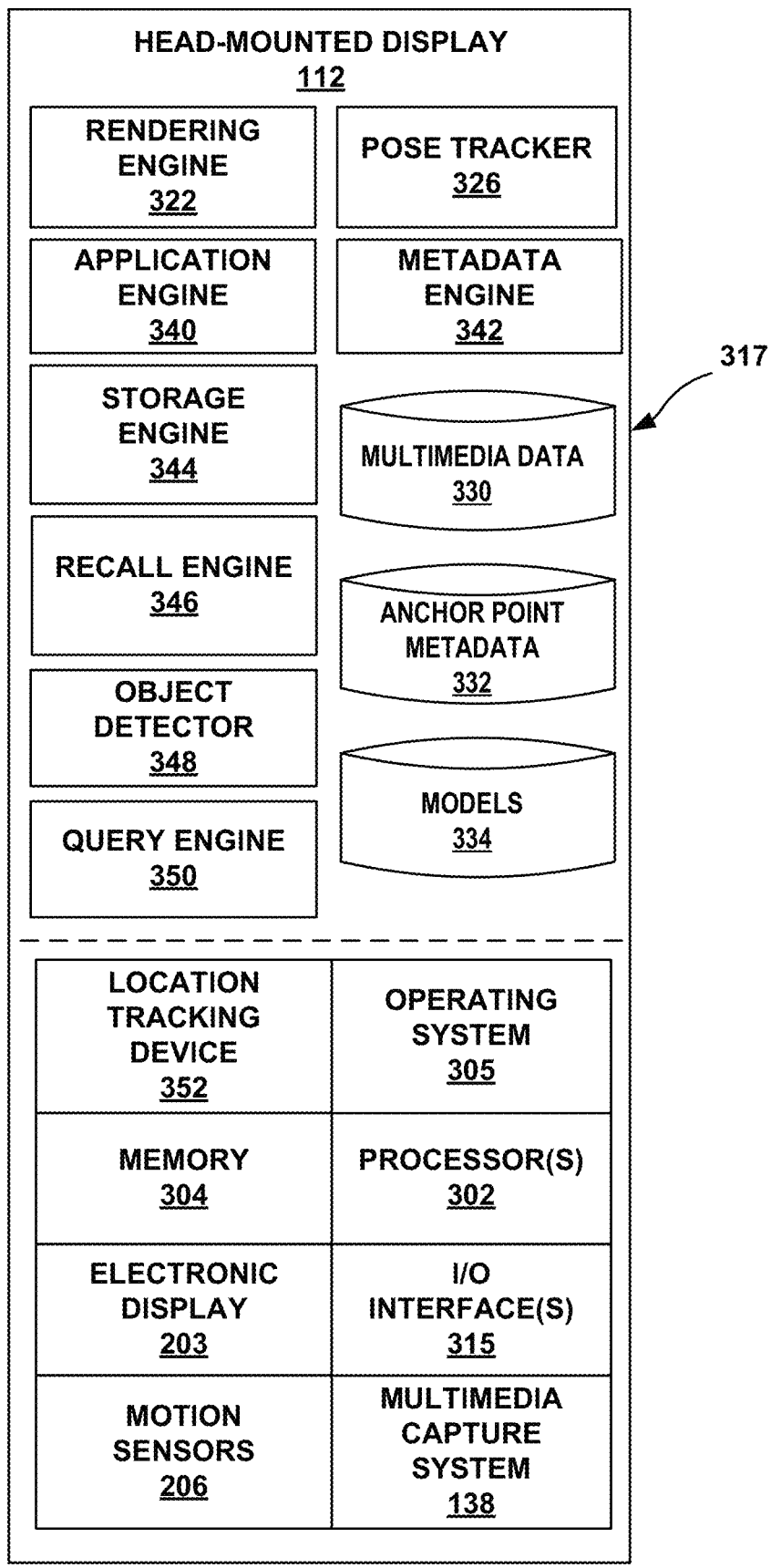
FIG. 3 is a block diagram depicting an example HMD implementing a multimedia query system, in accordance with the techniques of the disclosure.

FIG. 3 is a block diagram depicting an example HMD 112 implementing a multimedia query system, in accordance with the techniques of the disclosure. In the example of FIG. 3, HMD 112 performs multimedia data capture, storage, and search operations in accordance with the techniques described herein.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with other devices such as display devices, image capture devices, other HMDs, and the like. Moreover, the one or more I/O interfaces 315 may include one or more wired or wireless network interface controllers (NICs) for communicating with a network, such as network 104. Additionally, processor(s) 302 are coupled to electronic display 203, motion sensors 206, and multimedia capture system 138. In some examples, processors 302 and memory 304 may be separate, discrete components. In other examples, memory 304 may be on-chip memory collocated with processors 302 within a single integrated circuit. In some examples, one or more multimedia capture system 138 are configured to obtain raw multimedia data 330, including raw video data or raw audio data.

Software applications 317 of HMD 112 operate to provide a multimedia query application. In this example, software applications 317 include rendering engine 322, application engine 340, pose tracker 326, metadata engine 342, storage engine 344, recall engine 346, object detector 348, query engine 350, raw multimedia data 330, anchor point metadata 332, and models 334. Raw multimedia data 330 may include raw video data, raw audio data, and/or other data including location information, calendar event data for the user (e.g., invited persons, confirmed persons, meeting topic), physiological data for the user (e.g., heartbeat or electrocardiogram data generated by a monitoring sensor and received by HMD 112), etc. In some examples, raw multimedia data 330 may represent a repository or a cache.

Anchor point metadata 332 may include limited or basic information about the contents of one or more portions of raw multimedia data 330. For example, referring to FIG. 1A, anchor point metadata 332 for multimedia data captured for environment 114 may include information identifying person 101 (e.g., user identifier, user-entered name or identifier for that person, or a signature calculated from the face of person 101), the time (e.g., start and end times) and/or date that the metadata data from environment 114 was captured, information about the location of environment 114 (e.g., GPS coordinates, user-entered name or identifier for the location), an indication that a ball was present, etc. In other words, anchor point metadata 332 may include high level information that can be extracted from raw multimedia data 330 without thoroughly processing every object in every frame of the raw image data or every sound in the raw audio data. For example, anchor point metadata 332 may or may not include an indication that window 108 or frame 109 was captured in the raw video data. Similarly, while anchor point metadata 332 may include an indication that object 103 was present and/or discussed in the multimedia data captured for environment 114, the anchor point metadata 332 may not include information about the ball's trajectory 102, color, size, type, etc. In some examples, each anchor point of metadata may include a reference to respective portions of the raw multimedia data 330 to which it corresponds. In this way, anchor point metadata 332 may be searched to help identify relevant multimedia data 330. For example, user could search anchor point metadata for multimedia data including person 101 and the anchor point metadata associated with person 101 would include a reference to the multimedia data captured in environment 114, which may be faster or computationally less intense than processing and/or searching through raw multimedia data. The initial set of AI/ML models determines at least some of the content of the anchor point metadata 332, e.g., which object labels to include, which audio content references to include, and so forth. AI/ML models may receive training feedback from the user to adjust the subject determination of the content of the anchor point metadata 332.

Referring back to FIG. 3, models 334 may include various AI/ML models. These AI/ML models may include artificial neural networks (ANNs), decisions trees, support vector networks, Bayesian networks, genetic algorithms, linear regression, logistic regression, linear discriminant analysis, naïve Bayes, k-nearest neighbors, learning vector quantization, support vector machines, random decision forests, or any other known AI/ML mathematical models. These AI/ML models may be trained to process multimedia data. For example, these AI/ML models may be trained to recognize persons (e.g., faces), objects, locations, voices, speech, sounds, noises, or other events in raw multimedia data 330. In some examples, models 334 may be trained with a set of multimedia data, including image data including various persons, objects, or locations and/or audio data including various voices, speech, sounds, or noises. In some examples, object detector 348 may be configured to apply one or more models 334 to detect and/or track objects (including persons) in raw video data. In one or more aspects, the information stored in each of raw multimedia data 330, anchor point metadata 332, or models 334 can be stored in a repository, a database, a map, a search tree, or any other data structure. In some examples, multimedia data 330, anchor point metadata 332, or models 334 may be separate from HMD 112 (e.g., may be separate database(s) in communication with HMD 112 over network 104 of FIG. 1A).

In general, application engine 320 includes functionality to provide and present an artificial reality application, e.g., a multimedia query application, a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on HMD 112. Responsive to control by application engine 320, rendering engine 322 generates 3D artificial reality content for display to the user by application engine 340 of HMD 112.

Application engine 340 and rendering engine 322 construct the artificial content for display to user 110 in accordance with current pose information for HMD 112 within a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112 and user commands, to capture 3D information within the real-world environment, such as motion by user 110, and/or feature tracking information with respect to user 110. In some examples, application engine 340 and rendering engine 322 can generate and render for display one or more user interfaces for a multimedia query application in accordance with the techniques of this disclosure. For example, application engine 340 and rendering engine 322 may generate and render for display a user interface for a user to confirm or deny the capture or storage of particular multimedia data, an interface for entering a query, and/or and interface for displaying a response to a query.

Metadata engine 342 applies one or more metadata AI models (e.g., from models 334) trained to extract the one or more anchor points of metadata from the raw multimedia data. For example, the metadata models may be trained to extract metadata information about persons, objects, or locations from raw image data and/or extract anchor point metadata information about voices or other audio data of events (e.g., a dog barking, a ball bouncing, a bell ringing, or acoustic features of audio data). In some examples, metadata engine 342 stores the extracted anchor point metadata in anchor point metadata 332.

Storage engine 344 stores the raw multimedia data and/or the anchor point metadata extracted by metadata engine 332 in multimedia data 330 or anchor point metadata 332, respectively. In some examples, storage engine 344 stores one or more references (e.g., links or identifiers) to corresponding portions of multimedia data 330 in anchor point metadata 332. In some examples, storage engine 344 may store the raw multimedia data and/or anchor point metadata for window of time (e.g., 24 hours, a week, a month) and purge (e.g., delete, move, backup) the raw multimedia data and/or anchor point metadata after the window of time. For example, storage engine 344 may transmit the raw multimedia data and/or anchor point metadata to computing system 120 of FIG. 1A at the end of the window of time.

In some examples, storage engine 344 stores all captured raw multimedia data 330 and extracted anchor point metadata 332. In other examples, storage engine 344 determines whether to store the captured raw multimedia data or the corresponding anchor point metadata in multimedia data 330 or anchor point metadata 332, respectively based on the captured raw multimedia data, the extracted anchor point metadata, user input, and/or user preferences. For example, storage engine 344 may cause HMD 112 to prompt user 110 to confirm whether HMD 112 should store the captured raw multimedia data of environment 114 of FIG. 1A (e.g., at the end of the window of time, at the time the multimedia data is captured). Based on the user input, HMD 112 may train AL/ML models of models 334 to determine what raw multimedia data to store (or even capture) in the future without the need for user input. In some examples, user 110 may speak (e.g., say "yes," "store," or any other phase) or perform a gesture (e.g., make a thumbs down within the field of view of HMD 112, nod his or her head) to confirm a storage operation or may speak may speak (e.g., say "no," "cancel," or any other phase) or perform a gesture (e.g., make a thumbs down within the field of view of HMD 112, shake his or her head) to reject a storage operation. In some examples, user 110 may establish rules or user preferences for storing or even capturing multimedia data with respect to certain locations, persons, or topics. For example, a user may set a user preference not to store or capture multimedia data in a restroom, a user preference not to store or capture multimedia data regarding health topics, a user preference to always store multimedia data of the user's child, and the like.

Recall engine 346 maps queries to anchor point metadata 332 to identify matching anchor points for obtaining raw multimedia data candidates (e.g., multimedia data "memories") for a user. For example, recall engine 346 may receive a query regarding a multimedia "memory" stored in multimedia data 330. In some examples, user 110 may speak these queries and recall engine 346 may automatically detect them using known natural language processing (NLP) techniques on the captured audio data. In other examples, user 110 may enter these queries via a peripheral device (e.g., a keyboard) in a web browser or application interfacing with HMD 112 via I/O interfaces 315. In response to receiving a query, recall engine 346 applies the query to the stored anchor points of metadata 332 to identify raw multimedia data candidates from multimedia data 330 that may potentially contain information related to the query. For example, for the query "who is in the portrait at John's home?", recall engine 346 may search for one or more anchor points that include labels or other identifiers for "John" (i.e., person 101), "John's home" (e.g., the actual coordinates of the home or the label "John's home" associated with the physical location of the home), and/or "portrait" in anchor point metadata 332. In another example, for the query "what kind of ball was John playing with the last time I saw him?", recall engine 346 may search for one or more anchor points including "John" (i.e., person 101) and/or "ball" in anchor point metadata 332. In response to applying the query to the stored anchor point metadata, recall engine 346 may obtain one or more portions of the raw multimedia data 332 as raw multimedia data candidates. In this way, the entries of anchor point metadata 332 serve as starting points for searching of the raw multimedia data. In other words, recall engine 332 may reduce the search space (e.g., the amount of multimedia data that must be processed to generate a response to the query).

Query engine 350 then processes the raw multimedia data candidates obtained by recall engine 346 to generate a response to the query. In some examples, query engine 350 may apply another set of AI/ML models from models 334 to the obtained raw multimedia data candidates to infer a response to the query. For example, to generate a response to the query "who is in the portrait at John's home?", query engine 350 may apply object recognition techniques to one or more images of the raw multimedia data candidates to locate portrait 109 in individual image frames of the raw multimedia data candidates and then apply face recognition techniques to the pixels corresponding to portrait 109 in the individual image frames to determine a response to "who is in the portrait at John's house?" (e.g., to identify the persons in the portrait). The response may comprise one or more characteristics or inferences from the raw multimedia data candidates, including information about the three persons in portrait 109 (e.g., names, pictures, profile information) and/or an image or video data of portrait 109 of FIG. 1A. In some examples, query engine 350 may simply apply object recognition techniques to one or more images of the candidate raw multimedia data to locate portrait 109 and obtain image or video data of portrait 109 as the result (e.g., without applying any facial recognition techniques to the one or more images of the candidate raw multimedia data).

Object detector 348 is configured to process raw multimedia data to detect one or more objects. In some examples, object detector 348 is further configured to associate a label or other identifier to detected objects automatically or based on user input. For example, object detector 348 may compute a signature for objects detected in multimedia data 330 (e.g., when metadata engine 342 extracts anchor point metadata 332 from multimedia data 330 and/or when query engine 350 processes candidate multimedia data to respond to a query). This signature may comprise a hash value for the detected object. In some examples, this signature may be stored as anchor point metadata 332 and can be used to identify particular objects in multimedia data 330 (e.g., by comparing computed signatures of objects in captured multimedia data to stored signatures). In some examples, object detector 348 may track the frequency at which an object (or person) is detected. In some examples, object detector 348 will register ownership to a particular object by user 110 based on the frequency that the object is detected and/or the location in which that object is frequently detected. For example, object detector 348 will register an ownership to an object that is detected frequently (e.g., daily, two or more times a week, weekly) or that is regularly detected in the user's home or vehicle. Object detector 348 may also register ownership for objects that are frequently queried for (e.g., "where are my keys?"; "where is my phone?"; "where did I park the car?"). In some examples, object detector 348 may associate labels to objects (e.g., associate labels to a signature stored in anchor point metadata 332) based on user input. For example, object detector 348 may associate the label "my keys" to a set of keys, "my phone" to a phone, "John" to user 101 of FIGS. 1A-1B, or "John's home" to environment 114 of FIGS. 1A-1B. Object detector 348 may register human objects with a facial fingerprint and/or voice signature.

Motion sensors 206, can include sensors such as one or more accelerometers (also referred to as inertial measurement units or "IMUs") that output data indicative of current acceleration of HMD 112, radar or sonar that output data indicative of distances of HMD 112 from various objects, or other sensors that provide indications of a location or orientation of HMD 112 or other objects within a physical environment. Location tracking device 352 may be a GPS device that outputs location data of HMD 112.

Figure 4:
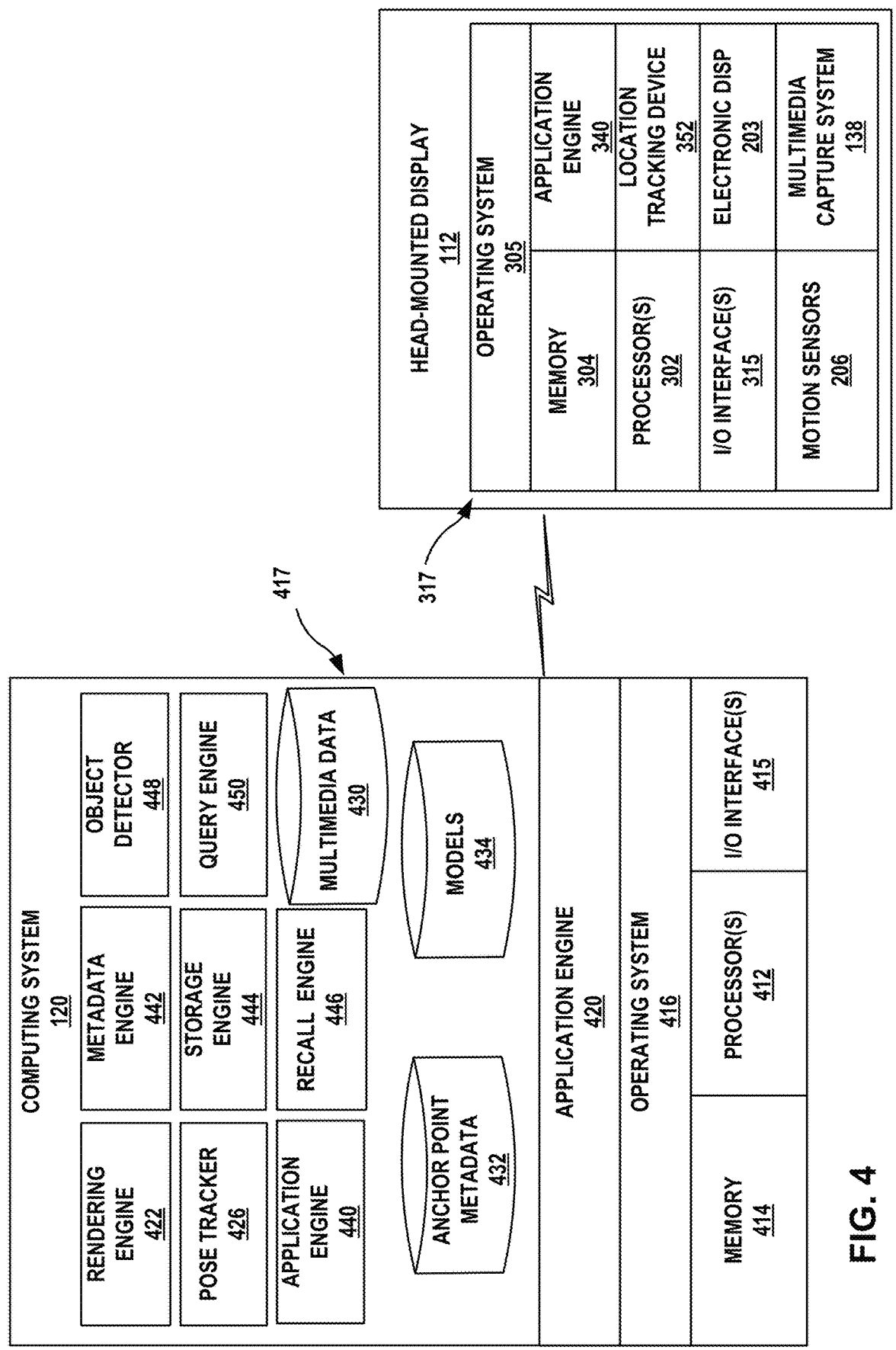
FIG. 4 is a block diagram showing example instances of the computing system and HMD of FIG. 1A, in accordance with the techniques of the disclosure.

FIG. 4 is a block diagram showing example instances of computing system 120 and HMD 112 of FIG. 1A, in accordance with the techniques of the disclosure. In the example of FIG. 4, HMD 112 captures raw multimedia data and transmits the raw multimedia data to computing system 120, which computing system 120 stores and queries searchable multimedia 'memories' for a user, in accordance with the techniques described herein.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, location tracking device 352, and multimedia capture system 138. In some examples, HMD 112 further includes any of the other components shown in FIG. 3. For example, HMD 112 may include metadata engine 342, multimedia data 330, anchor point metadata 332, models 334, storage engine 344, and/or object detector 448.

In general, computing system 120 is a device that processes raw multimedia data received from HMD 112, and stores and queries searchable multimedia 'memories' for a user. In some examples, computing system 120 is a single computing device, such as a server, a workstation, a desktop computer, a laptop, or gaming system. In some examples, at least a portion of computing system 120, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, computing system 120 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as a keyboard, a mouse, game controllers, display devices, image capture devices, HMDs, and the like. Moreover, the one or more I/O interfaces 415 may include one or more wired or wireless network interface controllers (NICs) for communicating with a network, such as network 104. Each of processors 302, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of computing system 120 operate to provide a multimedia query application. In this example, software applications 417 include application engine 440, rendering engine 422, pose tracker 426, metadata engine 442, storage engine 444, recall engine 446, object detector 448, query engine 450, raw multimedia data 430, anchor point metadata 432, and models 434.

In general, application engine 440 includes functionality to provide and present an artificial reality application, e.g., a multimedia query application, a teleconference application, a gaming application, a navigation application, an educational application, training or simulation applications, and the like. Application engine 440 may include, for example, one or more software packages, software libraries, hardware drivers, and/or Application Program Interfaces (APIs) for implementing an artificial reality application on computing system 120. Responsive to control by application engine 440, rendering engine 422 generates 3D artificial reality content for display to the user by application engine 340 of HMD 112.

Application engine 440 and rendering engine 422 construct the artificial content for display to user 110 in accordance with current pose information for HMD 112 within a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112, such as image data 430 from sensors on HMD 112, and, in some examples, data from any external sensors 90 (FIGS. 1A, 1B, 1C), such as external cameras, to capture 3D information within the real world environment, such as motion by user 110 and/or feature tracking information with respect to user 110. Based on the sensed data, computing system 120 constructs the artificial reality content for communication, via the one or more I/O interfaces 315, 415, to HMD 112 for display to user 110. In some examples, application engine 440 and rendering engine 422 can generate and render for display one or more user interfaces for a multimedia query application in accordance with the techniques of this disclosure. For example, application engine 440 and rendering engine 422 may generate and render for display a user interface for a user to confirm or deny the capture or storage of particular multimedia data, an interface for entering a query, and/or and interface for displaying a response to a query.

Metadata engine 442 applies one or more metadata AI models (e.g., from models 334) trained to extract the one or more anchor points of metadata from the raw multimedia data received from HMD 112 (e.g., as described above with reference to metadata engine 342 of FIG. 3). In some examples, metadata engine 442 stores the extracted anchor point metadata in anchor point metadata 432. In some examples, the anchor point metadata is extracted by the HMD 112 and transmitted to the query system with the raw multimedia data. In this case, metadata engine 442 may optionally verify the anchor point metadata and/or further extract additional anchor point metadata.

Storage engine 444 stores the raw multimedia data and/or the anchor point metadata extracted by metadata engine 432 in multimedia data 430 or by anchor point metadata 432, respectively. In some examples, storage engine 444 stores one or more references (e.g., links or identifiers) to corresponding portions of multimedia data 432 in anchor point metadata 432. In some examples, storage engine 344 stores raw multimedia data and/or anchor point metadata received from HMD 112 after this data is purged from HMD 112 (e.g., a described above with reference to FIG. 3). For example, HMD 112 may store raw multimedia data and/or anchor point metadata locally (e.g., in memory 304) for a window of time (e.g., 24 hours, a week, a month) and may transmit the raw multimedia data and/or anchor point metadata, via I/O interfaces 315, to computing system 120 at the end of that window of time.

In some examples, storage engine 444 stores all received raw multimedia data 430 and extracted anchor point metadata 432. In other examples, storage engine 444 determines whether to store the received raw multimedia data or the corresponding anchor point metadata in multimedia data 430 or anchor point metadata 432, respectively based on the captured raw multimedia data, the extracted anchor point metadata, user input, and/or user preferences. For example, storage engine 444 may cause HMD 112 to prompt user 110 to confirm whether certain multimedia data should be stored (e.g., as described above with reference to FIG. 3). Based on the user input, multimedia query system may train AI/ML models of models 334 to determine what raw multimedia data to store in the future without the need for user input. In some examples, a user may establish rules or user preferences for when multimedia data should be stored (or even capture) by storage engine 444.

Similar to recall engine 346 described above with respect to FIG. 3, recall engine 446 maps queries to anchor point metadata 432 to identify matching anchor points for obtaining raw multimedia data candidates (e.g., multimedia data "memories") for a user. For example, recall engine 446 may receive a query regarding a multimedia "memory" stored in multimedia data 330 from HMD 112 (e.g., via network 104). In some examples, a user may enter these queries via a peripheral device (e.g., a keyboard) in a web browser or application interfacing with computing system 120 via I/O interfaces 415. In response to receiving a query, recall engine 446 applies the query to the stored anchor points of metadata 432 to identify raw multimedia data candidates from multimedia data 430 that may potentially contain information related to the query (e.g., as described above with reference to FIG. 3). In response to applying the query to the stored anchor point metadata, recall engine 446 may obtain one or more portions of the raw multimedia data 432 as raw multimedia data candidates.

Query engine 450 then processes the raw multimedia data candidates obtained by recall engine 446 to generate a response to the query, and transmits that response to HMD 112 (e.g., via I/O interfaces 415 over network 104). For example, recall engine 446 may apply another set of AI/ML models from models 434 to the obtained raw multimedia data candidates to infer a response to the query (e.g., as described above with reference to FIG. 3). The response may comprise one or more characteristics or inferences from the raw multimedia data candidates, including information about the three persons in portrait 109 (e.g., names, pictures, profile information) and/or an image or video data of portrait 109 of FIG. 1A. In some examples, query engine 450 may simply apply object recognition techniques to one or more images of the candidate raw multimedia data to locate portrait 109 and obtain image or video data of portrait 109 as the result (e.g., without applying any facial recognition techniques to the one or more images of the candidate raw multimedia data).

Similar to object detector 348 described above with respect to FIG. 3, object detector 448 is configured to process raw multimedia data to detect one or more objects. In some examples, object detector 348 is further configured to associate a label or other identifier to detected objects automatically or based on user input (e.g., as described above with reference to object detector 348 of FIG. 3). For example, object detector 448 may compute a signature (e.g., a hash value) for objects detected in multimedia data 430 (e.g., when metadata engine 442 extracts anchor point metadata 432 from multimedia data 430 and/or when query engine 450 processes candidate multimedia data to respond to a query). In some examples, this signature may be stored as anchor point metadata 432 and can be used to identify particular objects in multimedia data 430 (e.g., by comparing computed signatures to stored signatures). In some examples, object detector 448 may track the frequency at which an object (or person) is detected and/or register an ownership to a particular object by a user based on the frequency that the object is detected and/or the location in which that object is frequently detected (e.g., as described above with reference to FIG. 3). Object detector 448 may register human objects with a facial fingerprint and/or voice signature. In some examples, object detector 448 may associate labels to objects (e.g., associate labels to a signature stored in anchor point metadata 432) based on user input, as described above.

Figure 5:
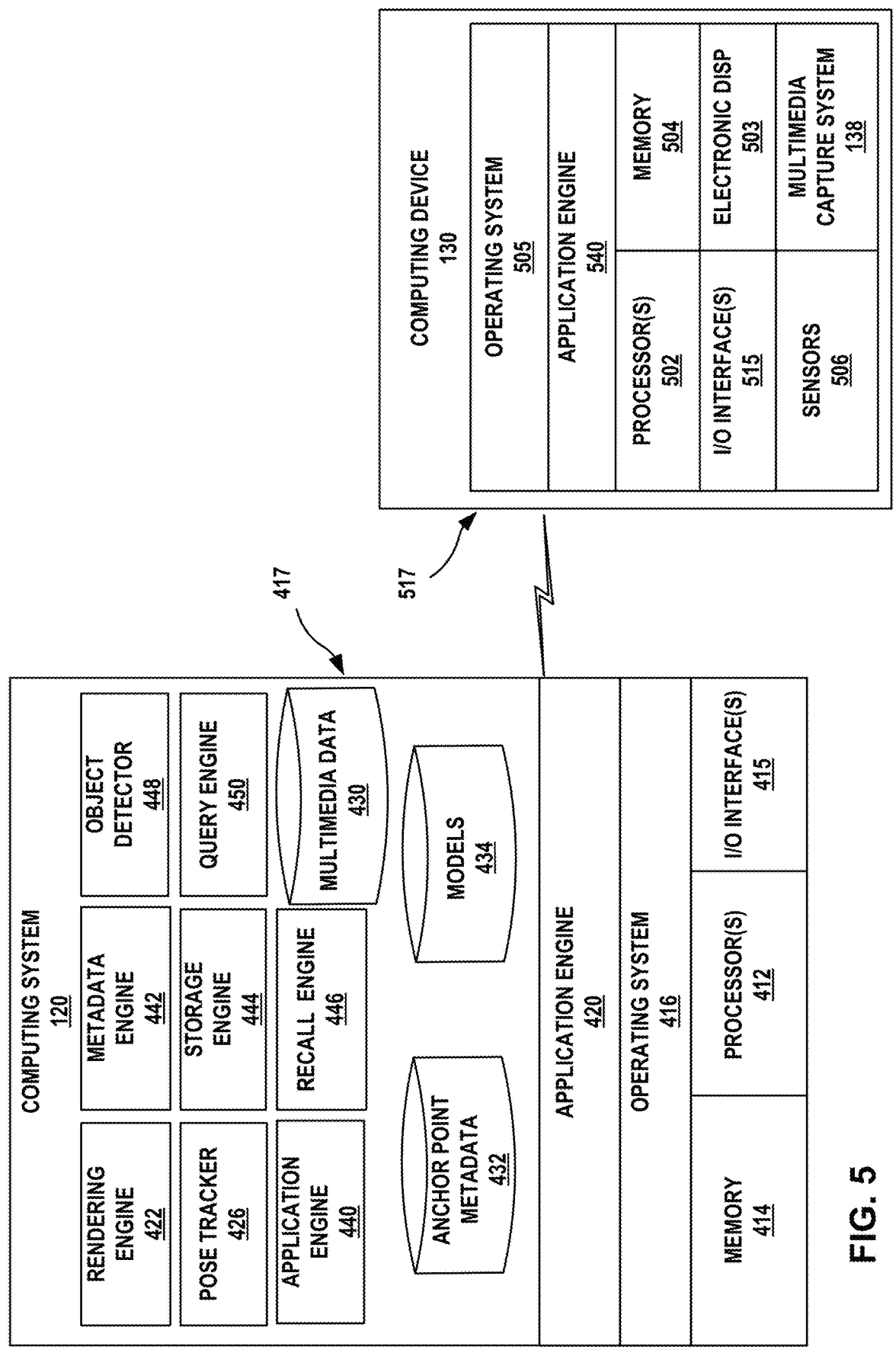
FIG. 5 is a block diagram showing example instances of the computing system and computing device of FIGS. 1A, 1B, in accordance with the techniques of the disclosure.

FIG. 5 is a block diagram showing example instances of the computing system 120 and computing device 130 of FIG. 1B, in accordance with the techniques of the disclosure. In the example of FIG. 5, computing device 130 captures raw multimedia data and transmits the raw multimedia data to computing system 120 similar to HMD 112 of FIG. 4. Computing system 120 also stores and queries searchable multimedia 'memories' for a user as described above with reference to FIG. 4.

In this example, computing device 130 includes one or more processors 502 and memory 504 that, in some examples, provide a computer platform for executing an operating system 505, which may be an embedded, real-time multitasking operating system, for instance, or other type of operating system. In turn, operating system 505 provides a multitasking operating environment for executing one or more software components 517. Moreover, processor(s) 502 are coupled to electronic display 503, sensors 506 (e.g., motion sensors), location tracking device 452, and multimedia capture system 138. In some examples, computing device 130 further include a metadata engine, multimedia data, anchor point metadata, AI models, a storage engine, and/or an object detector. For example, computing device 130 may extract anchor point metadata from the multimedia data it captures (e.g., as described above with reference to FIGS. 3 and 4). Computing device 130 in FIG. 5 is shown as a single computing device, which may correspond to a mobile phone, a tablet, a smart watch, a gaming console, workstation, a desktop computer, laptop, or other computing device. In other examples, computing device 130 may be distributed across a plurality of computing devices, such as a distributed computing network, a data center, or a cloud computing system.

In some examples, computing system 120 receives raw multimedia data from both HMD 112 of FIG. 4 and computing device 130 of FIG. 5. In some examples, HMD 112 and computing device 130 may transmit multimedia data of the same physical environment (e.g., environment 114) or from different physical environment. By capturing multimedia data about the same environment from two or more different sources, a greater amount of information may be captured. For example, raw video data may be captured from two or more different perspective or raw audio data may be captured from two different points of an environment, which may enable different sounds to be captured. In some examples, computing system 120 processes multimedia data from HMD 112 in the same way as it processes data from computing device 130, and vice versa. In some examples, storage engine 444 records the source of the metadata.

Figure 6:
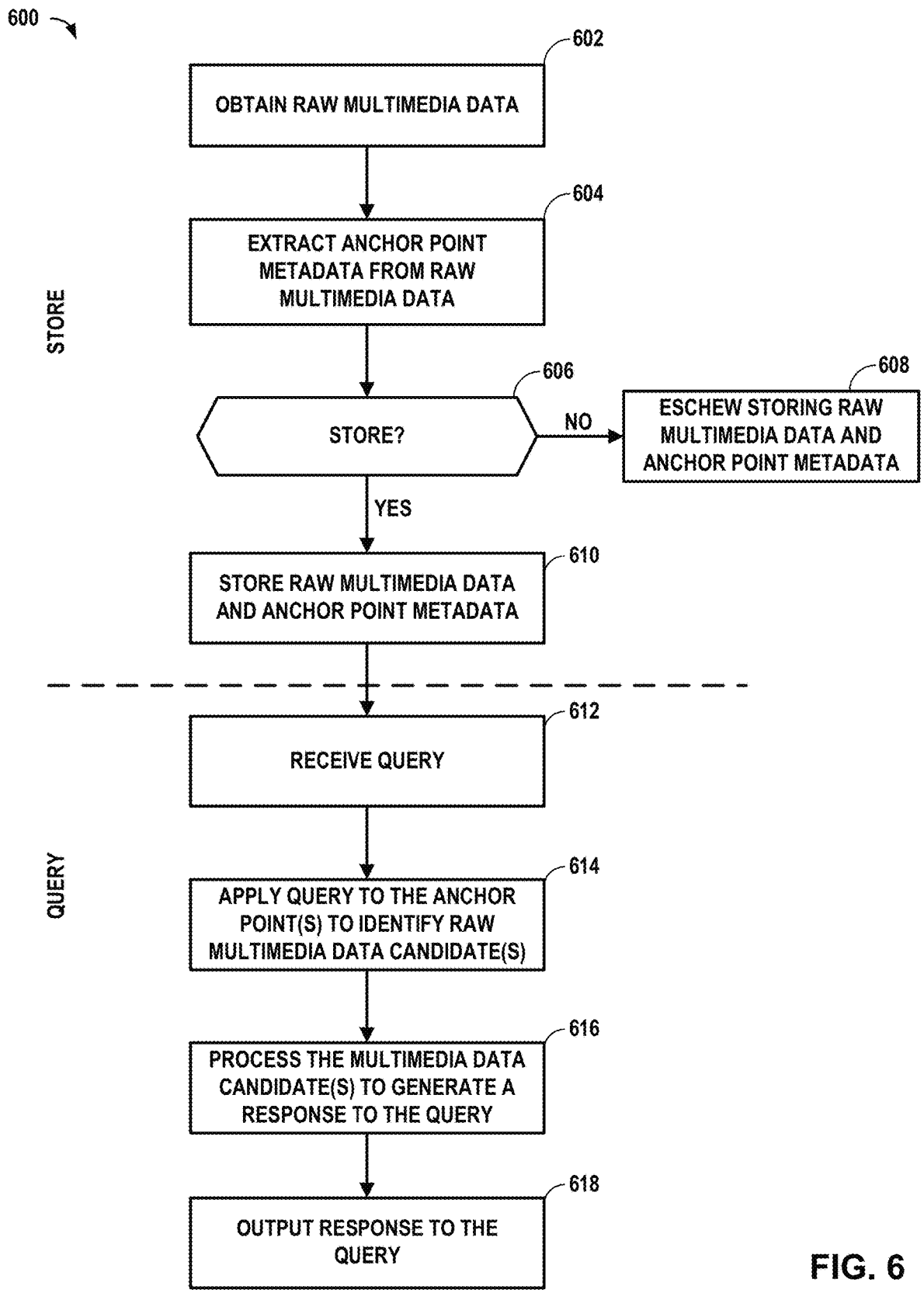
FIG. 6 is a flowchart illustrating multimedia storage and query operations in accordance with the techniques of the disclosure.

FIG. 6 is a flowchart 600 illustrating multimedia storage (602-610) and query (612-618) operations in accordance with the techniques of the disclosure. In some examples, the storage and query operations shown in FIG. 6 may be performed by HMD 112, computing device 130, and/or computing system 120.

First, multimedia capture system 138 of HMD 112 and/or computing system 130 captures raw multimedia data (e.g., raw video data, raw audio data, and/or other information such as location information and/or physiological data for the user) (602). In some examples, the raw multimedia data is captured automatically or manually. For example, multimedia capture system 138 of HMD 112 and/or multimedia system 138 of computing system 130 may be configured to always capture multimedia data when powered on. In some examples, multimedia capture system 138 of HMD 112 and/or multimedia system 138 of computing system 130 may be configured to capture multimedia data in response to user input initiating the data capture. Next, metadata engine 342 or 442 extracts anchor point metadata from the captured raw multimedia data (604). For example, metadata engine 342 or 442 applies one or more metadata AI models (e.g., from models 334 or 434) to the raw multimedia data to extract the one or more anchor points of metadata from the raw multimedia data. The extracted metadata may include information about persons, objects, or locations from raw image data and/or information about voices or other audio data of events (e.g., a dog barking, a ball bouncing, a bell ringing). In some examples, the extracted anchor points of metadata may include calculated signatures of objects or sounds.

Storage engine 344 or 444 determines whether to store the raw multimedia data and/or extracted anchor point metadata (606). For example, storage engine 344 or 444 may prompt user 110 to indicate whether the captured raw multimedia data should be stored. Based on the user input, the multimedia query system may train AL/ML models (e.g., models 334 and/or 434) that may be used to determine what raw multimedia data to store (or even capture) in the future. In response to determining that the raw multimedia data (e.g., in response to receiving user input indicating not to store the raw multimedia data or in response to a negative determination from one or more AI models) (NO branch of 606), storage engine 344 or 444 will eschew storing the raw multimedia data and the extracted anchor point metadata (608). In response to a determination that the multimedia query system should store the multimedia data (e.g., in response to receiving user input indicating to store the multimedia data or in response to a positive determination from one or more AI models) (YES branch of 606), the system may store the raw multimedia data and the extracted anchor point metadata (e.g., in multimedia data 330/430 or anchor point metadata 332/432, respectively) (610). In some examples, storage engine 344 or 444 also stores one or more references (e.g., links or identifiers) to corresponding portions of multimedia data 330 or 430 in anchor point metadata 332 or 432. In some examples, storage engine 344 or 444 may store the raw multimedia data and/or anchor point metadata for window of time (e.g., 24 hours, a week, a month) and purge (e.g., delete, move, backup) the raw multimedia data and/or anchor point metadata after the window of time. For example, storage engine 344 or 444 may transmit the raw multimedia data and/or anchor point metadata to computing system 120 at the end of the window of time. In some examples, user 110 may establish rules or user preferences for storing or even capturing multimedia data with respect to certain locations, persons, or topics. For example, a user may set a user preference not to store or capture multimedia data a restroom, a user preference not to store or capture multimedia data regarding health topics, a user preference to always store multimedia data of the user's child, and the like. In another example, storage engine 344 or 444 may store all multimedia data with unrecognized objects, persons, voices or sounds. In some examples, storage engine 344 or 444 stores the raw multimedia data in response to user input.

Next, recall engine 346 or 446 receives a query (612). In response to receiving the query, recall engine 346 or 446 applies the received query to the stored anchor point metadata 332 or 432 to identify raw multimedia data candidates from multimedia data 330 or 430, respectively, that may potentially contain information related to the query (e.g., as describe above with reference to FIGS. 3-5) (614). In response to identifying one or more portions of the raw multimedia data 332 as candidate multimedia data, query engine 350 or 450 processes the multidata candidates to generate a response to the query (616). For example, query engine 350 or 450 may process a full transcription of the one or more portions of raw multimedia data candidates and analyze the transcription to generate a response. In another example, query engine 350 or 450 may apply another set of AI/ML, models from models 334 or 434 to the obtained portions of raw multimedia data candidates to infer a response to the query (e.g., as described above with reference to FIGS. 3-5). In some examples, these AI/ML models may be specific models chosen by query engine 350 or 450 based on the query. For example, the AI/ML models may correspond to a particular person (a facial model, voice model), type of object (e.g., clothing model), and the like. The multimedia query system may then output the response to the query (618). For example, HMD 112 or computing device 130 may output a visual or auditory response. In some examples, the response may comprise one or more characteristics or inferences from the raw multimedia data candidates and/or the relevant raw multimedia data (e.g., one or more images or a video) outputted to a speaker and/or display.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example, and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example, and not by way of limitation, a first user may view one or more second users of an online social network through a "People You May Know" function of the online social network, or by viewing a list of friends of the first user. As an example, and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example, and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example, and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example, and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example, and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example, and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

What is claimed is:

1. A multimedia query system comprising:
   a multimedia capture system configured to capture raw multimedia data comprising at least one of raw video data or raw audio data;
   a metadata engine configured to extract one or more anchor points of metadata from the raw multimedia data and to store the one or more anchor points of metadata, wherein the anchor points of metadata includes references to respective portions of the raw multimedia data;
   a storage engine configured to store the raw multimedia data;
   a recall engine configured to receive a query and to apply the query to the one or more anchor points of metadata to identify one or more raw multimedia data candidates from the portions of the raw multimedia data, wherein the one or more raw multimedia data candidates include information related to the query; and
   a query engine comprising a multimedia artificial intelligence model trained to generate a response to the query by processing the one or more raw multimedia data candidates to infer the response, wherein the query engine is configured to output the response.

2. The multimedia query system of claim 1, wherein the multimedia artificial intelligence model comprises one or more multimedia models trained with a set of multimedia data comprising one or more of images of persons, images of objects, images of locations, audio data of voices, or audio data of events, wherein the response includes one or more characteristics about content in the one or more raw multimedia data candidates or one or more inferences from the content in the one or more raw multimedia data candidates.

3. The multimedia query system of claim 1,
   wherein the metadata engine comprises a metadata artificial intelligence model trained to extract the one or more anchor points of metadata from the raw multimedia data,
   wherein the metadata artificial intelligence model comprises one or more metadata models trained with a set of multimedia data comprising one or more of images of persons, images of objects, images of locations, audio data of voices, or audio data of events.

4. The multimedia query system of claim 1, further comprising:
   a location tracking device configured to determine a location of the location tracking device,
   wherein the metadata engine is further configured to generate one of the anchor points of metadata to include the location and the reference to the corresponding portion of the raw multimedia data.

5. The multimedia query system of claim 1, wherein the one or more anchor points of metadata includes information about one or more persons, objects, location, speech, sounds, topics, or time associated with the raw multimedia data.

6. The multimedia query system of claim 1, further comprising an object detector configured to detect and track one or more objects in the raw video data.

7. The multimedia query system of claim 6, wherein the object detector is further configured to associate a label to each of the one or more objects based on user input.

8. The multimedia query system of claim 1, further comprising an object detector configured to compute a signature for one or more objects in the raw video data and to detect the one or more objects in the raw video data based on a comparison of the signature and a plurality of stored signatures.

9. The multimedia query system of claim 8, wherein the object detector is further configured to register ownership of the one or more objects based on a frequency that the one or more objects are detected, the frequency that the one or more objects are queried, or user input.

10. The multimedia query system of claim 1, further comprising an object detector comprising an object artificial intelligence model trained to detect one or more objects in the raw video data, the artificial intelligence model comprises an object model trained with a set of multimedia data comprising one or more of images of persons, images of objects, or audio data of voices.

11. The multimedia query system of claim 1, wherein the storage engine is configured to determine which of the raw multimedia data to store.

12. The multimedia query system of claim 1, wherein the storage engine is further configured to determine which of the raw multimedia data to store based on the one or more anchor points of metadata with references to respective portions of the raw multimedia data and previous queries.

13. The multimedia query system of claim 1, wherein the storage engine is further configured to store all raw multimedia data for a window of time in a first repository and to determine which of the raw multimedia data to store in a second repository.

14. The multimedia query system of claim 13, wherein the storage engine comprises an artificial intelligence model trained to determine which of the raw video data or audio data to store in the second repository, the artificial intelligence model comprises a storage model trained with a set of video data and audio data selected by a user for storage.

15. A method comprising:
- extracting, by a server, one or more anchor points of metadata from raw multimedia data captured by a multimedia capture system, the raw multimedia data comprising at least one of raw video data or raw audio data, wherein the one or more anchor points of metadata includes references to respective portions of the raw multimedia data;
- storing, by the server, the one or more anchor points of metadata;
- storing, by the server, the raw multimedia data;
- receiving, at the server, a query;
- applying, by the server, the query to the or more anchor points of metadata to identify one or more raw multimedia data candidates, wherein the one or more raw multimedia data candidates include information related to the query;
- generating, by the server, a response to the query by processing, by a multimedia artificial intelligence model, the one or more raw multimedia data candidates to infer the response; and
- outputting, by the server, the response to the query.

16. The method of claim 15,
wherein the multimedia artificial intelligence model comprises one or more multimedia models trained with a set of multimedia data comprising one or more of images of persons, images of objects, images of locations, audio data of voices, or audio data of events, wherein the response includes one or more characteristics about content in the one or more raw multimedia data candidates or one or more inferences from the content in the one or more raw multimedia data candidates.

17. The method of claim 15,
wherein the one or more anchor points of metadata are extracted by a metadata artificial intelligence model trained to extract the one or more anchor points of metadata from the raw multimedia data,
wherein the metadata artificial intelligence model comprises one or more metadata models trained with a set of multimedia data comprising one or more of images of persons, images of objects, images of locations, audio data of voices, or audio data of events.

18. The method of claim 15, further comprising computing a signature for one or more objects in the raw video data and to detect the one or more objects in the raw video data based on a comparison of the signature and a plurality of stored signatures.

19. The method of claim 18, further comprising registering ownership of the one or more objects based on a frequency that the one or more objects are detected, the frequency that the one or more objects are queried, or user input.

20. A non-transitory computer-readable storage medium comprising instructions that configure one or more programmable processors to:
- extract one or more anchor points of metadata from raw multimedia data captured by a multimedia capture system, the raw multimedia data comprising at least one of raw video data or raw audio data, wherein the one or more anchor points of metadata includes references to respective portions of the raw multimedia data;
- store the one or more anchor points of metadata;
- store the raw multimedia data;
- receive a query;
- apply the query to the or more anchor points of metadata to identify one or more raw multimedia data candidates, wherein the one or more raw multimedia data candidates include information related to the query;
- generate a response to the query by processing, by a multimedia artificial intelligence model, the one or more raw multimedia data candidates to infer the response; and
- output the response to the query.

* * * * *